(12) United States Patent
Mabuchi

(10) Patent No.: US 10,776,642 B2
(45) Date of Patent: Sep. 15, 2020

(54) SAMPLING TRAINING DATA FOR IN-CABIN HUMAN DETECTION FROM RAW VIDEO

(71) Applicant: TOYOTA RESEARCH INSTITUTE, INC., Los Altos, CA (US)

(72) Inventor: Mitsuhiro Mabuchi, Santa Clara, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 64 days.

(21) Appl. No.: 16/257,858

(22) Filed: Jan. 25, 2019

(65) Prior Publication Data

US 2020/0242379 A1 Jul. 30, 2020

(51) Int. Cl.
| | | |
|---|---|---|
| *G06K 9/62* | (2006.01) | |
| *G06K 9/00* | (2006.01) | |
| *G06T 7/73* | (2017.01) | |
| *G06K 9/46* | (2006.01) | |

(52) U.S. Cl.
CPC ..... *G06K 9/00832* (2013.01); *G06K 9/00248* (2013.01); *G06K 9/00355* (2013.01); *G06K 9/469* (2013.01); *G06K 9/6256* (2013.01); *G06T 7/73* (2017.01)

(58) Field of Classification Search
CPC .................................................. G06K 9/00832
USPC .......................................................... 382/159
See application file for complete search history.

(56) References Cited

U.S. PATENT DOCUMENTS

| | | |
|---|---|---|
| 8,620,026 B2 | 12/2013 | Datta et al. |
| 9,031,317 B2 | 5/2015 | Yakubovich et al. |
| 9,290,146 B2 | 3/2016 | Breed |
| 2006/0050953 A1 | 3/2006 | Farmer et al. |
| 2011/0123117 A1 | 5/2011 | Johnson et al. |

*Primary Examiner* — Stephen P Coleman
(74) *Attorney, Agent, or Firm* — Seyfarth Shaw LLP

(57) ABSTRACT

Systems and methods to efficiently and effectively train artificial intelligence and neural networks for an autonomous or semi-autonomous vehicle are disclosed. The systems and methods provide for the minimization of the labeling cost by sampling images from a raw video file which are misdetected, i.e., false positive and false negative detections, or indicate abnormal or unexpected driver behavior. Supplemental information such as controller area network signals and data may be used to augment and further encapsulate desired images from video.

20 Claims, 6 Drawing Sheets

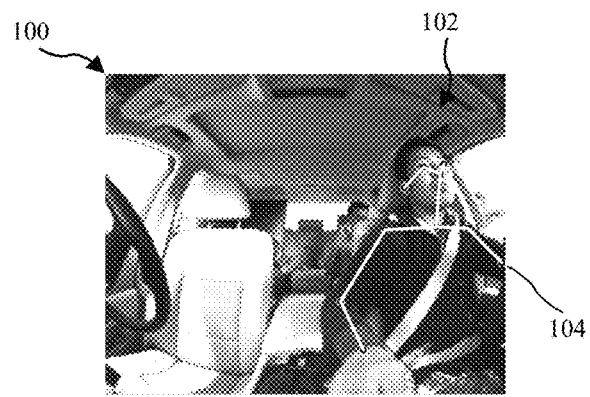 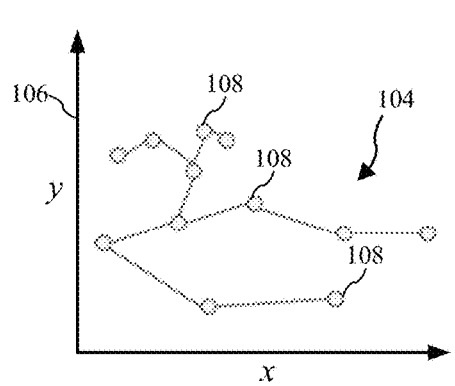
*FIG. 1(a)*        *FIG. 1(b)*
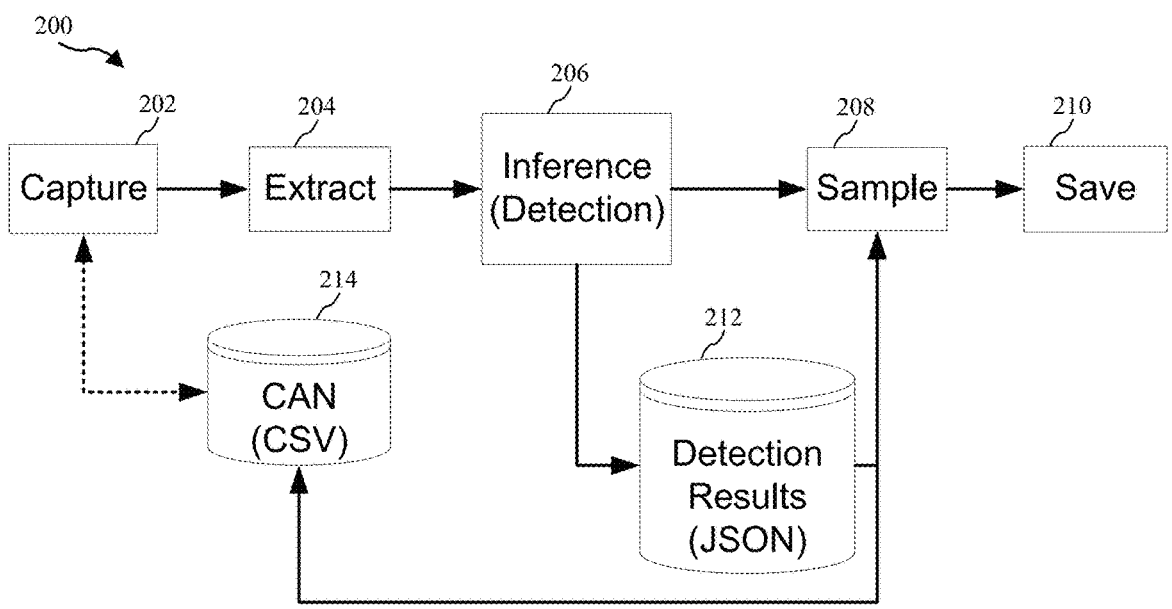
*FIG. 2*

SAMPLING TRAINING DATA FOR IN-CABIN HUMAN DETECTION FROM RAW VIDEO

FIELD OF TECHNOLOGY

Aspects of the present disclosure relate to training artificial neural networks, and more particularly to generating training data from in-cabin human activities captured in raw video.

BACKGROUND

An artificial neural network (ANN) is trained to perform a task, such as classifying an input, by training the ANN with training data. The training data may include positive and negative samples corresponding to the task. For example, when training an ANN to classify images of cats, the training data may include images of cats (positive sample) and images of other animals (negative samples). In some cases, it is difficult to obtain high quality training data, including mis-detected images as false-positives and false negatives.

For example, when training an ANN used by an autonomous or semi-autonomous vehicle to detect driver behavior, the training data should include images of a driver in various poses. Each pose may be labeled to identify a behavior performed by the driver. In most cases, a driver and/or a passenger are limited in their movements while sitting in a vehicle. Therefore, it is difficult to obtain a wide range of training samples for the training data.

Extracting and sampling images from raw video files obtained by an on-board, in-cabin camera can be important for building an efficient data-set. However, if every frame, or even an indiscriminate sampling of frames from a raw video feed was extracted, an inordinately high number of images would be generated, many of which would have little comparable value to other images. Further, the labeling cost would be very high due to the number of images.

SUMMARY

Aspects of the present disclosure provide systems and methods to efficiently and effectively train artificial intelligence and neural networks. Aspects of the disclosure include providing for the minimization of the labeling cost by sampling images from a raw video file which are mis-detected, i.e., false positive and false negative detections, or indicate abnormal or unexpected driver behavior. To build efficient data-set, inference results may be used because mis-detected images may improve computer vision algorithms such as those implemented as artificial neural networks (ANNs). In addition, supplemental information such as controller area network signals and data may be used to augment and further encapsulate desired images from video.

According to an aspect of the present disclosure, a method of sampling images for a dataset is disclosed. The method may include capturing a sequence of images and for at least one image of the sequence of images, generating a feature graph of a target. The feature graph may include a plurality of feature points located in a two-dimensional plane. The feature graph may be compared to a baseline feature graph to determine a number of unexpected feature point locations. The at least one image may be classified as a valuable image based on the number of unexpected feature point locations. The valuable image may be saved in the dataset.

According to an aspect of the present disclosure, a system for sampling images is disclosed. The system may include a vehicle with a camera disposed in the vehicle and configured to capture a sequence of images. A processor may be configured to generate, for at least one image, a feature graph of a target. The feature graph may include a plurality of feature points located in a two-dimensional plane. The feature graph may be compared to a baseline feature graph to determine a number of unexpected feature point locations. The at least one image may be classified as a valuable image based on the number of unexpected feature point locations. The system may further include a database for saving the valuable image in the dataset.

According to an aspect of the present disclosure, a method of training an artificial neural network is disclosed. The method may obtain a sequence of images of the cabin of a vehicle and for each image of the sequence of images, generate a feature graph of a vehicle driver. The feature graph may include a plurality of feature points located in a two-dimensional plane. The feature graph may be compared to a baseline feature graph to determine a number of unexpected feature point locations. Attribute information may be obtained from one or more vehicle subsystems over a controller area network. The attribute information may be correlated with the image according to a time reference. The attribute information correlated with the image may be compared with prior attribute information. The at least one image may be classified as a valuable image based on the number of unexpected feature point locations and a difference in attribute information exceeding a defined threshold. The valuable image may be saved in the dataset and the artificial neural network may be seeded with the dataset of valuable images.

This has outlined, rather broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

FIGS. 1(a)-(b) depict a sample image and driver pose coordinates according to an aspect of the present disclosure.

FIG. 2 depicts a block diagram of a process pipeline for sampling in-cabin behavior data according to an aspect of the present disclosure.

DETAILED DESCRIPTION

Figure 3:
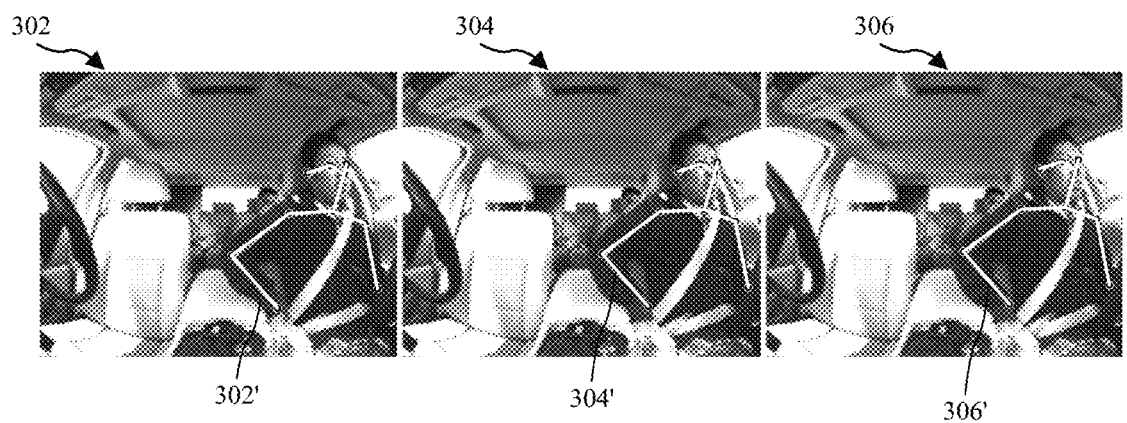
FIG. 3 depicts a sequence of similar images and driver pose coordinates according to an aspect of the present disclosure.

The detailed description set forth below, in connection with the appended drawings, is intended as a description of various configurations and is not intended to represent the only configurations in which the concepts described herein may be practiced. The detailed description includes specific details for providing a thorough understanding of the various concepts. It will be apparent to those skilled in the art, however, that these concepts may be practiced without these specific details. In some instances, well-known structures and components are shown in block diagram form in order to avoid obscuring such concepts.

According to aspects of the present disclosure, systems and methods for sampling in-cabin behavior for machine learning purposes are disclosed. Autonomous and semi-autonomous agents for vehicles may use scene understanding models, such as a trained artificial neural network (ANN), to identify behaviors or changes in position of occupants of the vehicle, in particular a driver. The agents may identify a driver, the driver's posture or pose and any unexpected movement or changes to the driver's pose. Significant changes in the driver's position may be correlated with additional vehicle data obtained over a controller area network (CAN) on the vehicle in order to associate the change in position with concurrent events occurring in the vehicle. The correlations may be used to train an ANN for future recall when similar behavior is observed by the agent.

In a semi-autonomous or fully autonomous vehicle, a camera may be disposed and aimed to capture raw video images of the occupants of the vehicle. In particular, a camera may be positioned to capture the upper body of a vehicle driver. FIG. 1(a) depicts an exemplary image 100 from a raw video file. Due to space and design constraints, cameras may identify and focus on the upper torso of the driver. For example, the upper body of a driver 102 may include several feature points 108 important to monitoring driver behavior including, without limitation, eyes, ears, nose mouth, shoulders, elbows and hands. These feature points 108 may be selected and identified as features of a driver 102 that are often moving or interacting with the vehicle or the in-cabin environment, or are easily detectable reference features. The feature points 108 may form a feature graph 104 representing the upper body of the driver 102. The feature graph 104 of the feature points 108 of the driver 102 may be mapped to a two-dimensional, (x, y) coordinate system 106, as shown in FIG. 1(b). Information obtained from the feature graph 104 as compared to prior and subsequent feature graphs may assist the system in identifying images and behavior of interest to identify mis-detected images and use them as training data for the ANN.

FIG. 2 depicts a block diagram 200 of an exemplary process pipeline of an in-cabin sampling system according to an aspect of the present disclosure. As shown in block 202, raw video of one or more occupants of a vehicle may be captured. In particular, a camera may be positioned and aimed to record the upper body of the driver of the vehicle. The camera, according to one embodiment may be a RGB camera or may be another image capturing device such as an Infrared (IR) camera, LIDAR, a time-of-flight (TOF) camera, or other high-quality image capturing device. Raw video data may be recorded and stored locally on the vehicle or may be transmitted elsewhere and stored remotely. The raw video may be captured according to a local time reference or clock maintained on the vehicle, whereby each frame or image of the raw video includes a timestamp.

As shown in block 204 individual images may be extracted from the raw video file for processing. The extracted images, as shown in block 206, may be processed to infer information about the driver. Target objects and features of the driver may be detected using known image processing algorithms. The target features identified as detection results 212 in the image may be output in a data file, such as a JavaScript Object Notation file, or the like.

As shown in block 208, and described below, the processed images may be sampled such that images satisfying selection criteria may be added to a training data set for the ANN. As shown in block 210 the sampled images may be saved and stored for labeling.

According to one aspect of the disclosure, a controller area network (CAN) 214 may be in communication with the sampling system and other vehicle subsystems to correlate data in the sampled images to other actions and events occurring in the vehicle. The system may receive CAN data along with the image, which may be correlated by timestamp. CAN data may be collected and used in a constant manner, or the CAN data may be collected when specific events occur, thereby reducing the extraction and sampling cost on the system. The correlated data may be uploaded to a server to extract and sample as described herein. According to one aspect, because of the necessary hardware and computational power, a server may be used to process image and CAN data. However, given sufficient computing power on the vehicle, all data capture, processing, and outputs may be generated on the vehicle. . . . According to one aspect, CAN data may be transformed from the raw signals to a human-readable format, such as CSV or the like.

Aspects of the disclosure provide for sampling images from a raw video file to identify valuable images based on the recognition of targeted feature points of a driver. FIG. 3 depicts three representative images 302, 304, 306 of a driver 102 extracted from a raw video file. Superimposed on each of the images is a graph 302', 304', 306' representing the locations of feature points 108 of the driver 102. As shown in FIG. 3, the position and pose of the driver 102 and resulting graphs 302', 304', 306' are substantially identical. The nature of operating a vehicle dictates that for a large portion of the time, the position and pose of a driver 102 will be the same. The driver may be relegated to a seated position, in which the driver's head, including her eyes, ears, and mouth, her shoulders, hips, and at least one hand are relatively stationary and, in a two-dimensional space, located at substantially the same (x, y) coordinates. According to the images 302, 304, 306, the only detail that has changed or carries any significance, is time. Such images 302, 304, 306 yield a high confidence value for an artificial intelligence system that the driver pose is in an expected and normal position, compared to images of low confidence in which the driver's pose may be in an abnormal or unexpected position. The value of the largely identical images 302, 304, 306 may be minimal, in a training context, compared to the cost of storing, labeling and otherwise processing them. When training an ANN, identifying and using mis-detected images or images of abnormal and unexpected driver behavior may have a greater training value than high confidence images of normal behavior.

Figure 4:
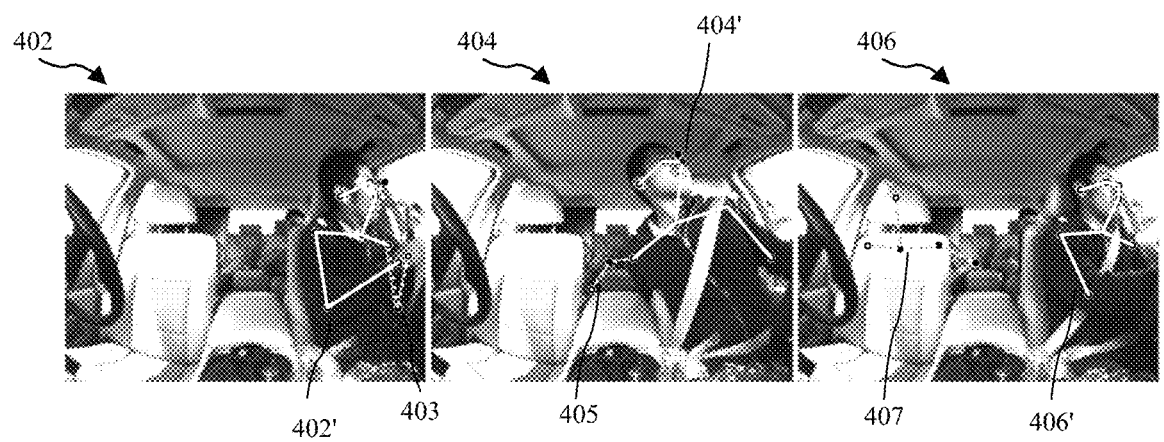
FIG. 4 depicts a sequence of differing images and driver pose coordinates according to an aspect of the present disclosure.

FIG. 4 depicts a sequence of images 402, 404, 406 of a driver 102 with feature graphs 402', 404', 406' superimposed over the driver 102. As shown by the feature graphs 402', 404', 406', the driver 102 is captured in significantly different poses at different times in the raw video file. In a first image 402, the driver's pose has changed significantly as the driver has turned his head and arms away from the front of the vehicle. The feature graph 402' has changed significantly, and as a result, the feature graph may include mis-detected portions 403' (shown as connected by a dotted line). In a second image 404 the driver has reached behind his seat, drawing his head and body away from the expected driver pose. The feature graph 404' may include, as a result, a mis-detected portion 405. In a third captured image 406, the driver 102 has returned to an expected position with a feature graph 406' approximately where an expected driver should be. The system may, however, mis-detect additional features 407 in the scene due to the presence of additional passengers in the vehicle. The stark differences between the driver positions and resulting graphs 402', 404', 406', along with the mis-detected portions 403, 405, 407, indicate a deviation from an expected pose or position and may trigger an identification of the images 402, 404, 406 as valuable to an ANN learning process. Further, as described below, attributes and data obtained from other subsystems over a vehicle CAN may be correlated or otherwise used to augment training data to teach the ANN what is occurring in the vehicle at the same time as the captured image. For example, vehicle event characteristics, such as steering angle, turn signal setting, acceleration, deceleration, velocity, gear-shift setting, windshield wiper setting, headlight setting, audio/video setting, environmental control setting, brake position, or gas pedal position, or the like, may be associated with one or more of the sampled images 402, 404, 406 in order to provide additional contextual information to train the ANN to recognize a variety of events.

According to an aspect of the disclosure, the in-cabin sampling system may be tasked with identifying a target within the vehicle. The target may be a person-of-interest, such as a driver, or in some circumstances may be a specific occupant or passenger. As detailed herein, the present disclosure may focus on the vehicle driver or operator, however one skilled in the art will recognize that the systems and methods described may be implemented to identify, monitor, track or otherwise analyze other occupants in the vehicle.

Figure 5:
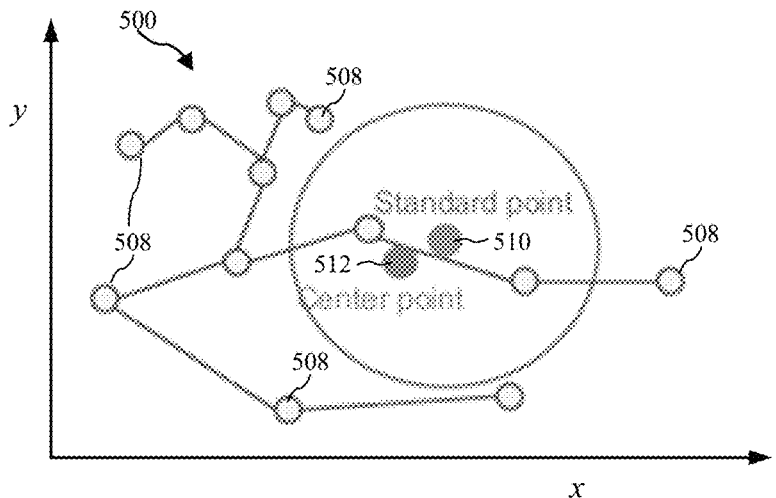
FIG. 5 depicts an exemplary driver pose with coordinates according to an aspect of the present disclosure.

To locate and identify the driver of a vehicle, the system may compare a feature graph of the feature points of a person-of-interest to a previous feature graph having predetermined and expected feature point locations. FIG. 5 depicts an exemplary feature graph 500 generated from an in-cabin image capture. As described herein, the feature graph 500 may include one or more feature points 508 that correspond to a feature of the driver's body and position within the vehicle. The feature points 508 may be chosen and identified as features of the driver's body that directly or indirectly interact with the vehicle, such as eyes, ears, mouth, and hands, as well as portions or joints of the body that may be identified to connect or reference other targeted feature points, including shoulders, elbows, hips or the like. In a two-dimensional image, each feature point may be plotted on an (x, y) grid and given a coordinate pair.

To identify the driver, a center point 512 may be determined among the detected feature points 508 for each identified person in the image. According to one aspect, the center point 512 for each individual may be determined by separately finding a maximum and a minimum value for all x and y values of identified feature points 508, and determining the mid-point between the minimum and maximum values in both the x and y directions. To determine a driver, the center point 512 of each identified person may be compared to a standard point 510 previously determined to be the expected coordinates of where the system predicts the driver may be. The identified person having the smallest distance (L2 Euclidean distance) between its respective center point 512 and the standard point 510 may be identified as the driver, i.e., the driver may be the person identified as having a center point 512 closest to the standard point 510. The previously determined standard point 510 may be determined, according to one aspect, by averaging the center points 512 of previously identified drivers imaged by the system.

The in-cabin sampling system, having identified a driver or other occupant, may seek to sample images of interest from the raw video file and label such sampled images for ANN training. Images of a driver's pose, and the resulting feature graph, that are similar to those of previous and subsequent images, may be deemed to have little or no training value for the ANN. As such, those images may be ignored or otherwise discounted. Images that the in-cabin sampling system may identify as indicative of abnormal or unexpected poses may be determined to have increased value for training the ANN and therefore may be selected, appropriately labeled and added to the training dataset.

Figure 6:
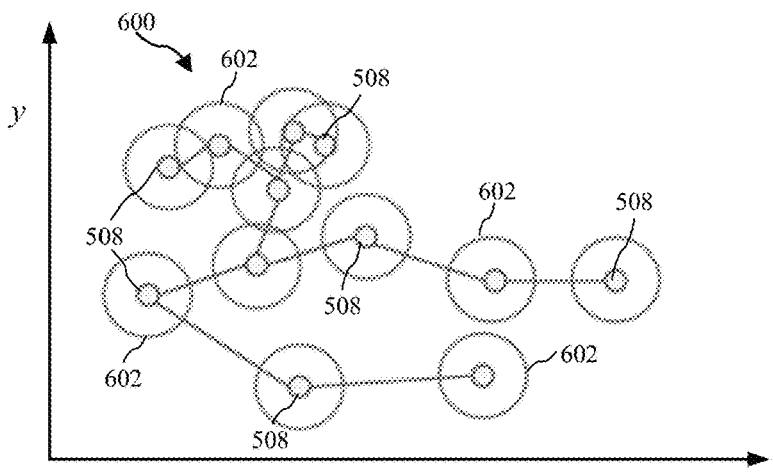
FIG. 6 depicts an exemplary driver pose with coordinates within respective ranges according to an aspect of the present disclosure.

To identify valuable images for sampling, the system may compare the feature graphs of a current image to those previously recorded. According to an aspect of the disclosure, each identified feature point may be compared to corresponding feature points of one or more previous image. FIG. 6 depicts an exemplary baseline feature graph 600 of a driver pose and several feature points 508. The baseline feature graph 600 may be determined by averaging the locations of feature points 508 over a defined time period to establish an expected pose for the driver.

To determine a change in feature points 508, the system may define a baseline feature range 602 for each feature point 508. According to one aspect, the baseline feature range 602 may include all coordinates within a given radius of the coordinates of the feature point 602. If, in a subsequent image, the (x, y) coordinates of a detected feature point 508 are not within the baseline feature range 602, the feature point 508 may be classified as a changed feature. If the number of changed feature points 508 exceeds a defined threshold, the system may classify the image as a changed pose and select the image for further labeling and addition to the training dataset.

Figure 7:
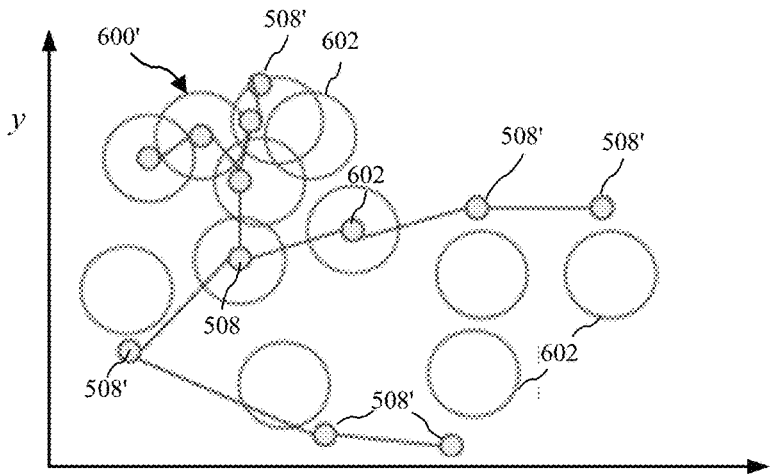
FIG. 7 depicts an exemplary driver pose with a certain coordinates out of their respective ranges according to an aspect of the present disclosure.

FIG. 7 depicts an exemplary feature graph 600' of a driver pose in an image subsequent to the determination of the baseline feature graph 600 of FIG. 6. The baseline feature ranges 602 of FIG. 7 are located in the same positions as those of FIG. 6. As depicted in FIG. 7, the feature graph 600' includes one or more changed feature points 508'. Those changed feature points 508' may be identified as those feature points lying outside of the baseline feature ranges 602 defined in the baseline feature graph 600.

As shown in FIG. 7, the feature graph 600' includes six changed features 508' located outside of each feature's respective baseline range 602. Given that half of the feature points 508' have been detected as outside of the baseline ranges 602, the system may classify the driver's pose as abnormal or unexpected and select the image for further labeling and addition to the training dataset. The threshold for classifying a driver pose and its image for selection may be determined as a percentage of changed feature points, or may be a discrete number. A sampled image may be labeled with additional contextual and environmental information to augment the image data for use in the training dataset.

As described herein, the in-cabin sampling system may communicate with or be part of a CAN and send data to and receive data from other vehicle subsystems to supplement the image data of the sampled images. According to an aspect of the disclosure, the system may correlate data from other subsystems on the CAN with the sampled images from the raw video file. Attributes from one or more vehicle sensors may be obtained and used to further label a sampled image. For example, at the time a sampled image is captured, the system may determine that the steering angle of the vehicle exceeds a first threshold, such as +/−10°, and a turn signal is detected, yet the steering angle does not exceed a second threshold, such as +/−30°. The system may define an attribute, using at least this data, as a lane change operation. The relevant data may be correlated with the sampled image and added to the ANN dataset, such that the ANN may subsequently identify a lane change operation when a similar driver pose is detected under similar contextual and environmental vehicle conditions or events.

Similarly, building on the previous example, if the second threshold of +/−30° was exceeded, the system may define an attribute of a corner turn (as opposed to a lane change). The sampled image may be labeled with the attribute and the associated data and recorded in the dataset. Other contextual and environmental information that may be obtained from vehicle subsystems may include, without limitation, steering wheel angles, turn signals, gas and brake pedal positions, acceleration, deceleration, velocity, selected gear (Parking, Driving, Reverse) windshield wiper setting, headlight setting, or the like.

FIG. 4 is a diagram illustrating an example of a hardware implementation for an ANN training system 800, according to aspects of the present disclosure. The ANN training system 800 may be a component of a vehicle, a robotic device, or other device. For example, as shown in FIG. 4, the ANN training system 800 may be a component of a car 828. Aspects of the present disclosure are not limited to the ANN training system 800 being a component of the car 828, as other devices, such as a bus, boat, drone, or robot, are also contemplated for using the ANN training system 800. The car 828 may be autonomous or semi-autonomous.

The ANN training system 800 may be implemented as a portion of a CAN with a bus architecture, represented generally by a bus 830. The bus 830 may include any number of interconnecting buses and bridges depending on the specific application of the ANN training system 800 and the overall design constraints. The bus 830 may link together various circuits including one or more processors and/or hardware modules, represented by a processor 820, a communication module 822, a location module 818, a sensor module 802, a locomotion module 826, a planning module 824, and a computer-readable medium 814. The bus 830 may also link various other circuits such as timing sources, peripherals, voltage regulators, and power management circuits, which are well known in the art, and therefore, will not be described any further.

The ANN training system 800 may include a transceiver 816 coupled to the processor 820, the sensor module 802, an in-cabin sampling system 808, the communication module 822, the location module 818, the locomotion module 826, the planning module 824, and the computer-readable medium 814. The transceiver 816 is coupled to an antenna 834. The transceiver 816 communicates with various other devices over a transmission medium. For example, the transceiver 816 may receive commands via transmissions from a user or a remote device. As another example, the transceiver 816 may transmit driving statistics and information from the in-cabin sampling system 808 to a server (not shown).

The in-cabin sampling system 808 may include the processor 820 coupled to the computer-readable medium 814. The processor 820 may perform processing, including the execution of software stored on the computer-readable medium 814 providing functionality according to the disclosure. The software, when executed by the processor 820, causes the ANN training system 800 to perform the various functions described for a particular device, such as the car 828, or any of the modules 802, 808, 814, 816, 818, 820, 822, 824, 826. The computer-readable medium 814 may also be used for storing data that is manipulated by the processor 820 when executing the software.

The sensor module 802 may be used to obtain measurements via different sensors, such as a first sensor 806, a second sensor 804, and a third sensor 810. The first sensor 806 may be a vision sensor, such as a stereoscopic camera or a red-green-blue (RGB) camera, for capturing 2D images. The second sensor 804 may be a ranging sensor, such as a light detection and ranging (LIDAR) sensor or a radio detection and ranging (RADAR) sensor. The third sensor 810 may include an in-cabin camera for capturing raw video or images of the interior environment of the car 828. Of course, aspects of the present disclosure are not limited to the aforementioned sensors as other types of sensors, such as, for example, thermal, sonar, and/or lasers are also contemplated for either of the sensors 804, 806. The measurements of the first sensor 806 and the second sensor 804 may be processed by one or more of the processor 820, the sensor module 802, the in-cabin sampling system 808, the communication module 822, the location module 818, the locomotion module 826, the planning module 824, in conjunction with the computer-readable medium 814 to implement the functionality described herein. In one configuration, the data captured by the first sensor 806 and the second sensor 804 may be transmitted to an external device via the transceiver 816. The first sensor 806 and the second sensor 804 may be coupled to the car 828 or may be in communication with the car 828.

The location module 818 may be used to determine a location of the car 828. For example, the location module 818 may use a global positioning system (GPS) to determine the location of the car 828. The communication module 822 may be used to facilitate communications via the transceiver 816. For example, the communication module 822 may be configured to provide communication capabilities via different wireless protocols, such as WiFi, long term evolution (LTE), 3G, etc. The communication module 822 may also be used to communicate with other components of the car 828 that are not modules of the in-cabin sampling system 808.

The locomotion module 826 may be used to facilitate locomotion of the car 828. As an example, the locomotion module 826 may control movement of the wheels. As another example, the locomotion module 826 may be in communication with a power source of the car 828, such as an engine or batteries. Of course, aspects of the present disclosure are not limited to providing locomotion via wheels and are contemplated for other types of components for providing locomotion, such as propellers, treads, fins, and/or jet engines.

The ANN training system 800 may also include the planning module 824 for planning a route or controlling the locomotion of the car 828, via the locomotion module 826, based on the analysis performed by the in-cabin sampling system 808. In one configuration, the planning module 824 overrides the user input when the user input is expected (e.g., predicted) to cause a collision. The modules may be software modules running in the processor 820, resident/stored in the computer-readable medium 814, one or more hardware modules coupled to the processor 420, or some combination thereof.

The in-cabin sampling system 808 may be in communication with the sensor module 802, the transceiver 816, the processor 820, the communication module 822, the location module 818, the locomotion module 826, the planning module 824, and the computer-readable medium 814. In one configuration, the in-cabin sampling system 808 may receive sensor data from the sensor module 802. The sensor module 802 may receive the sensor data from the first sensor 806 and the second sensor 804. According to aspects of the disclosure, the sensor module 802 may filter the data to remove noise, encode the data, decode the data, merge the data, extract frames, or perform other functions. In an alternate configuration, the in-cabin sampling system 808 may receive sensor data directly from the first sensor 806 and the second sensor 804.

Figure 8:
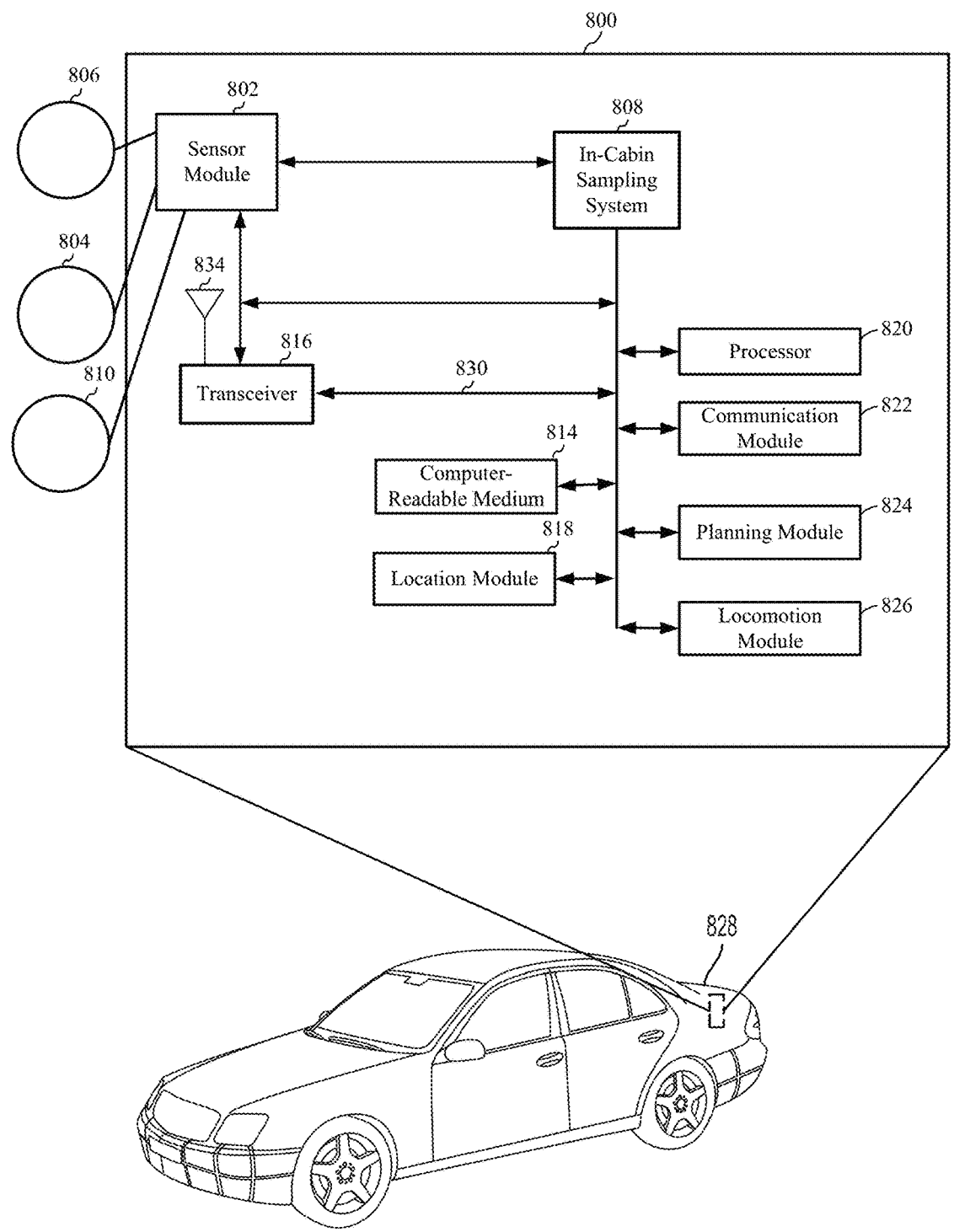
FIG. 8 depicts a diagram illustrating an example of a hardware implementation of an in-cabin behavior training module according to an aspect of the present disclosure.

As shown in FIG. 8, the in-cabin sampling system 808 may obtain images, either still images or video from the third sensor 810, such as an in-cabin camera. The raw images or video file may be communicated across the network to the in-cabin sampling system 808 to allow for the sampling of images detecting valuable in-cabin behavior data for use in training an ANN. Images may be processed as described herein to identify driver poses and other behavior that may deviate from a normal or expected behavior. An image classified as abnormal or unexpected may be augmented or labeled with additional contextual and environmental information relating to concurrent events or settings within the vehicle, as previously described. The labeled images may then be stored in the training dataset.

Figure 9:
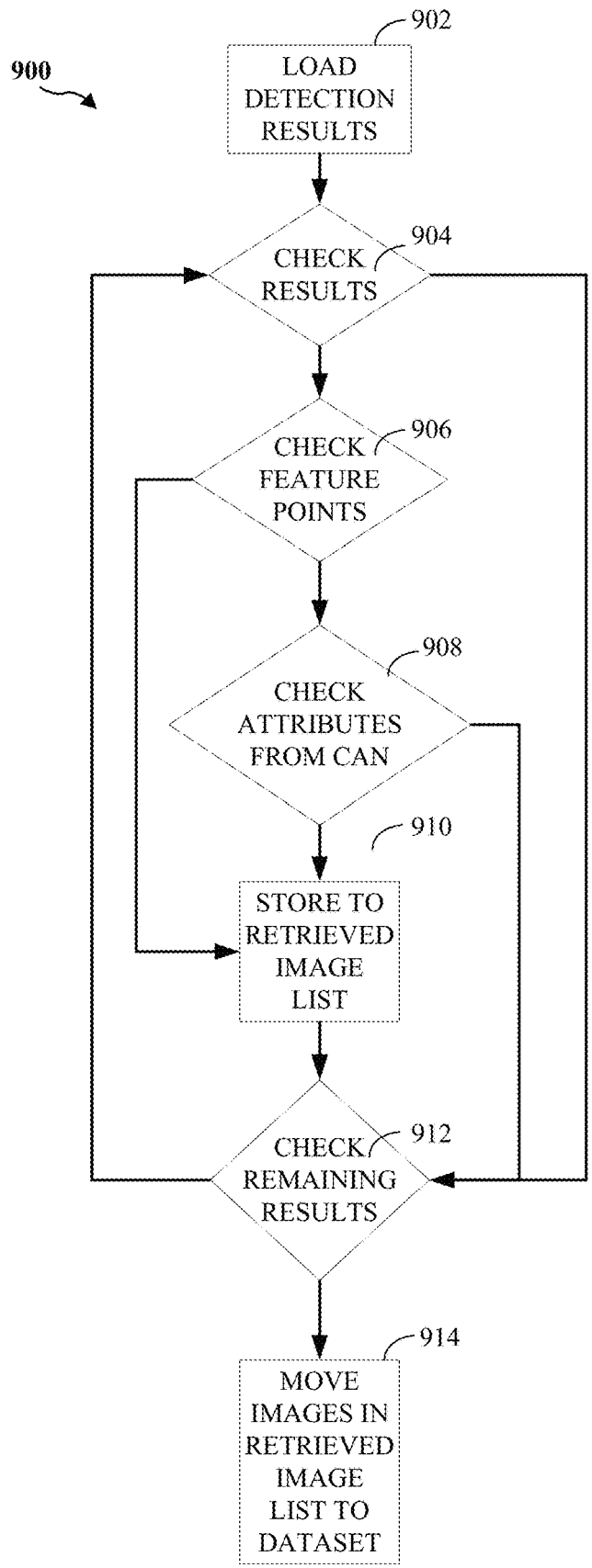
FIG. 9 illustrates a flow diagram for sampling in-cabin behavior data according to an aspect of the present disclosure.

FIG. 9 illustrates a process 900 for sampling images from a raw video file. According to one aspect of the disclosure, as shown in block 902, detection results as described herein, may be loaded to an in-cabin sampling system along with corresponding CAN signal sets, i.e., event and sensor information obtained from other vehicle subsystems. The CAN signal sets may be correlated with the detection results according to timestamps appended to both the images as captured, and the data associated with the subsystem events.

As shown in block 904, the detection results may be checked to against a confidentiality threshold. The system may look for low-confidence detected images, which indicate an abnormal or unexpected driver pose. If the system is confident that the feature points of the driver graphs are in or are close to their expected locations, the image may not be sampled as it is likely to be similar to other images captured. Confidentiality of detection results may be formed based on the number of targeted feature points detected out of a total number expected to be found. For example, using the illustrative feature graph of FIGS. 5-7, with a total number of twelve expected target points, a confidentiality level may be determined based on the number of detected feature points out of twelve possible points. One or more thresholds may be defined to characterize the confidence of the results. For example, a high confidence level may be defined if seven or more feature points out of the twelve feature points (greater than ~58%) are detected in an expected location for a given image. Similarly, a low confidence level may be defined if fewer than seven feature points are detected in their respective locations in the image (less than ~58%).

While aspects of the disclosure detail a feature graph having twelve feature points detailing a driver pose, one skilled in the art will recognize that the system may be configured to detect any number of feature points of a driver or occupant, depending on the degree of accuracy or granularity sought. Similarly, the threshold numbers detailed herein are exemplary and may be chosen according to any level of specificity or certainty.

According to an aspect of the disclosure, if the detection results are classified as a high confidence result, the system may move on to the next image for a confidence determination, as shown in block 912. If however, the detection result is classified as a low confidence result, the system may proceed to check the detected feature points against feature points previously detected and located in one or more prior images, as shown in block 906. According on an aspect of the disclosure, for each feature point, a distance may be calculated from the (x, y) coordinates of the detected feature point to the (x, y) coordinates of an expected location of that feature point. If the distance is within a defined range, the feature point may be considered to be in its expected location. The expected location for each feature point may, according to one aspect, be based on an average location of the feature point from previously recorded drivers.

If the distance between the detected location of the feature point and the expected location of the feature point exceeds the defined range, the feature point may be considered to be outside of its expected location. If the number of feature points determined to be outside of the defined range is less than the confidentiality threshold, or another defined limit, the image may de determined to be similar to previous images and the system may move on to the next image, as shown in block 912. If the number of feature points determined to be outside of the defined ranges exceeds the confidentiality threshold, or another defined limit, the system may proceed to check one or more attributes obtained from the CAN, as shown in block 908. The attributes from the CAN obtained at the same time as the current image may be compared for changes to the attributes of one or more previous images. If fewer than a defined number of attributes are determined to be different from those of previous images, the system may move onto the next image as shown in block 912.

If, however, the number of different attributes is greater than the defined number, then the image may be stored as a sampled image in a Retrieved Image List, as shown in block 910. The sampled image may be recorded with the associated data generated during the sampling process, including, without limitation, an image ID, feature point detection locations, confidence values, and attribute data. The system may move to the subsequent image as shown in block 912 for processing.

The sampling process 900 may continue for each image captured in the video file. Once all images have been processed, the system may move the images and the associated data in the Retrieved Image List to the training dataset, as shown in block 914. The images and associated data in the training data set may be used to train an ANN various aspects of in-cabin driver behavior.

Figure 10:
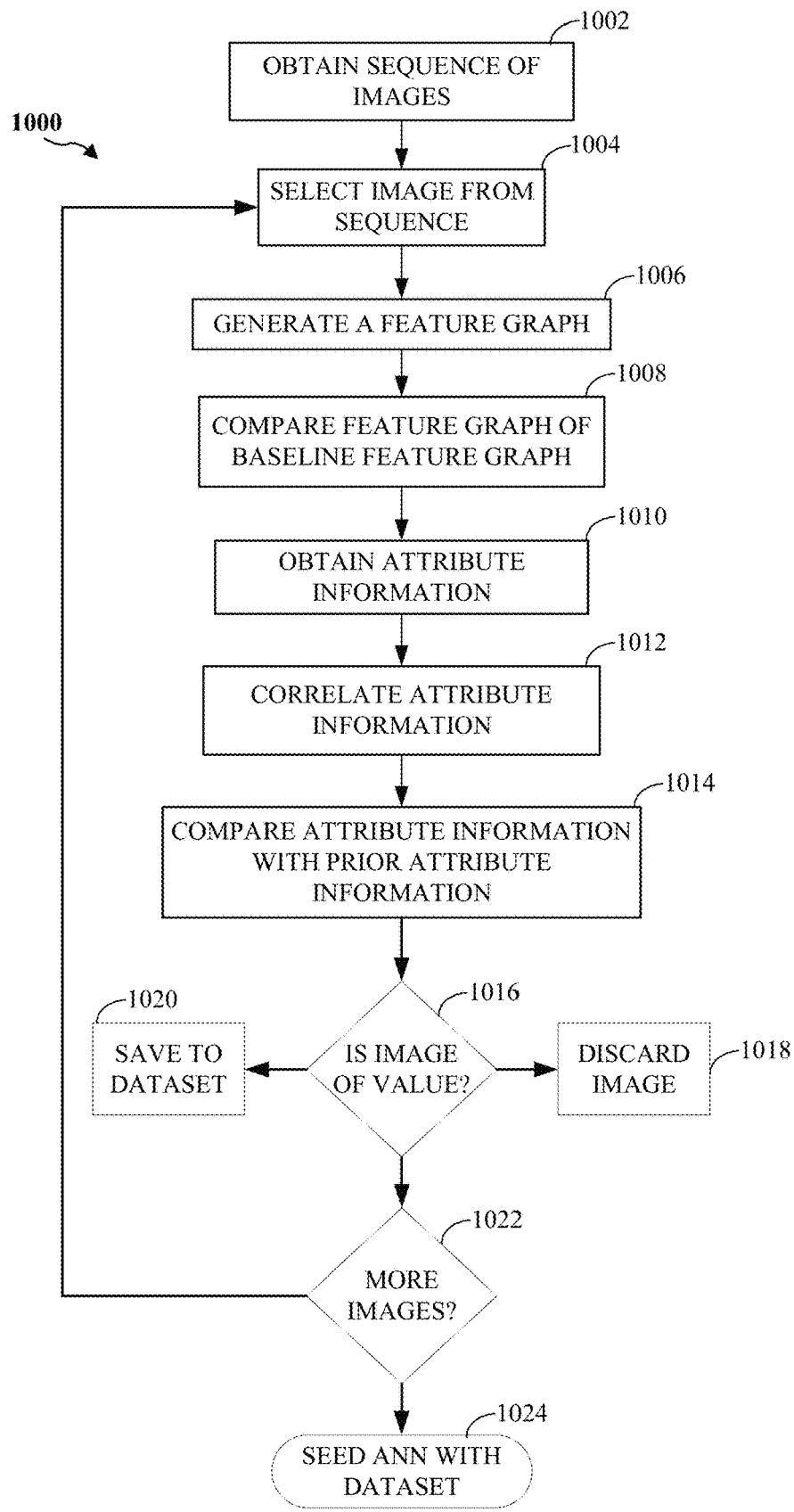
FIG. 10 illustrates a flow diagram of a method of training an artificial neural network according to an aspect of the present disclosure.

FIG. 10 illustrates a method 1000 for generating an ANN training dataset for autonomous or semi-autonomous vehicles according to an aspect of the present disclosure As shown in block 1002 the method of training an artificial neural network may include obtaining a sequence of images of the cabin of a vehicle as described herein. As shown in block 1004, an image may be selected and processed. For each image of the sequence of images, as shown in block 1006 a feature graph of a vehicle driver may be generated. The feature graph may include a plurality of feature points located in a two-dimensional plane. As shown in block 1008, the feature graph for the image is compared to a baseline feature graph to determine a number of unexpected feature point locations. As shown in block 1010 attribute information may be obtained, as detailed herein, from one or more vehicle subsystems over a controller area network. As shown in block 1012, the attribute information may be correlated with the image according to a time reference. As shown in block 1014, the attribute information correlated with the image may be compared with prior attribute information.

As shown in block 1016, a determination may be made as to whether the image is of value to the training data set based on the number of unexpected feature point locations and a difference in attribute information exceeding a defined threshold. If it is determined to be of value, the image may be classified as a valuable image, and as shown in block 1020 the image may be saved in the dataset. If the image does not have value to the training dataset, the image may be discarded, as shown in block 1018. As shown in block 1022, if there are additional images remaining in the sequence, the steps shown in blocks 1004, 1006, 1008, 1010, 1012, 1014, and 1016 may be repeated for every image in the sequence of images obtained. As shown in block 1024, once all images have been processed, the artificial neural network may be seeded with the dataset of valuable images.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure rather than limiting, the scope of the present disclosure being defined by the appended claims and equivalents thereof.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a processor specially configured to perform the functions discussed in the present disclosure. The processor may be a neural network processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. Alternatively, the processing system may comprise one or more neuromorphic processors for implementing the neuron models and models of neural systems described herein. The processor may be a microprocessor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or such other special configuration, as described herein.

The steps of a method or algorithm described in connection with the present disclosure may be embodied directly in hardware, in a software module executed by a processor, or in a combination of the two. A software module may reside in storage or machine readable medium, including random access memory (RAM), read only memory (ROM), flash memory, erasable programmable read-only memory (EPROM), electrically erasable programmable read-only memory (EEPROM), registers, a hard disk, a removable disk, a CD-ROM or other optical disk storage, magnetic disk storage or other magnetic storage devices, or any other medium that can be used to carry or store desired program code in the form of instructions or data structures and that can be accessed by a computer. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Software shall be construed to mean instructions, data, or any combination thereof, whether referred to as software, firmware, middleware, microcode, hardware description language, or otherwise.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The machine-readable media may comprise a number of software modules. The software modules may include a transmission module and a receiving module. Each software module may reside in a single storage device or be distributed across multiple storage devices. By way of example, a software module may be loaded into RANI from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any storage medium that facilitates transfer of a computer program from one place to another.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means, such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method of sampling images for a dataset comprising:
   capturing a sequence of images;
   for at least one image of the sequence of images:
      generating a feature graph of a target, the feature graph including a plurality of feature points located in a two-dimensional plane;
      comparing the feature graph to a baseline feature graph to determine a number of unexpected feature point locations;
      classifying the at least one image as a valuable image based on the number of unexpected feature point locations; and
      saving the valuable image in the dataset.

2. The method of claim 1 wherein the target is a person-of-interest in the at least one image.

3. The method of claim 1 wherein the feature graph comprises a pose of the person-of-interest.

4. The method of claim 1 further comprising identifying the target by comparing a center points of one or more potential targets to a standard point, the target having the smallest distance between the center point and the standard point.

5. The method of claim 1 wherein the at least one image is classified as the valuable image based on the unexpected feature point locations exceeding a defined threshold.

6. The method of claim 1 further comprising training an artificial neural network for a vehicle using the valuable images of the dataset.

7. The method of claim 1 wherein determining the number of unexpected feature point locations is determined by:
   for each feature point:
      determining a distance from the feature point to a baseline feature point in the baseline feature graph; and
      classifying the feature point as located in an unexpected location if the distance exceeds a defined threshold.

8. The method of claim 7 wherein the center point of the one or more potential targets is determined by calculating a mid-point between a maximum (x, y) value feature point and a minimum (x, y) value feature point.

9. The method of claim 1 further comprising:
   obtaining attribute information over a controller area network from an auxiliary system, the attribute information having a timestamp substantially similar to a timestamp of the at least one image;
correlating the attribute information with the at least one image;
wherein saving the valuable image in the dataset includes saving the correlated attribute information.

10. The method of claim 9 further comprising:
determining a change in attribute information from previously obtained attribute information; and
classifying the at least one image is further classified as a valuable image based upon the change in the attribute information.

11. The method of claim 9 wherein attribute information comprises at least one of steering angle, turn signal setting, acceleration, deceleration, velocity, gear-shift setting, windshield wiper setting, headlight setting, audio/video setting, environmental control setting, brake position, or gas pedal position.

12. The method of claim 1 wherein the person-of-interest is an occupant of a vehicle.

13. The method of claim 12 wherein the occupant of a vehicle is a driver.

14. The method of claim 13 wherein the plurality of feature points comprise location points for at least one of the driver's hands, eyes, ears, shoulders, elbows or mouth.

15. A system for sampling images comprising:
a vehicle;
a camera disposed in the vehicle and configured to capture a sequence of images;
a processor configured to:
for at least one image, generate a feature graph of a target, the feature graph including a plurality of feature points located in a two-dimensional plane;
compare the feature graph to a baseline feature graph to determine a number of unexpected feature point locations;
classify the at least one image as a valuable image based on the number of unexpected feature point locations;
a database for saving the valuable image in the dataset.

16. The system of claim 15 further comprising a controller area network in communication with a plurality of vehicle subsystems and the processer, the processor further configured to:
correlate attribute information from the plurality of vehicle subsystems with the at least one image, the attribute information and at least one image correlated according to a time reference.

17. The system of claim 15 wherein the camera is at least one of an RGB camera, LIDAR or time-of-flight camera.

18. The method of claim 17 wherein the feature graph of the vehicle driver is representative of a driver pose.

19. The method of claim 17 wherein the plurality of feature points comprise location points for at least one of the driver's hands, eyes, ears, shoulders, elbows or mouth.

20. A method of training an artificial neural network comprising:
obtaining a sequence of images of the cabin of a vehicle;
for each image of the sequence of images:
generating a feature graph of a vehicle driver, the feature graph including a plurality of feature points located in a two-dimensional plane;
comparing the feature graph to a baseline feature graph to determine a number of unexpected feature point locations;
obtaining attribute information from one or more vehicle subsystems over a controller area network;
correlating the attribute information with the image according to a time reference;
comparing the attribute information correlated with the image with prior attribute information;
classifying the at least one image as a valuable image based on the number of unexpected feature point locations and a difference in attribute information exceeding a defined threshold;
saving the valuable image in the dataset;
seeding the artificial neural network with the dataset of valuable images.

* * * * *